Figure 1:
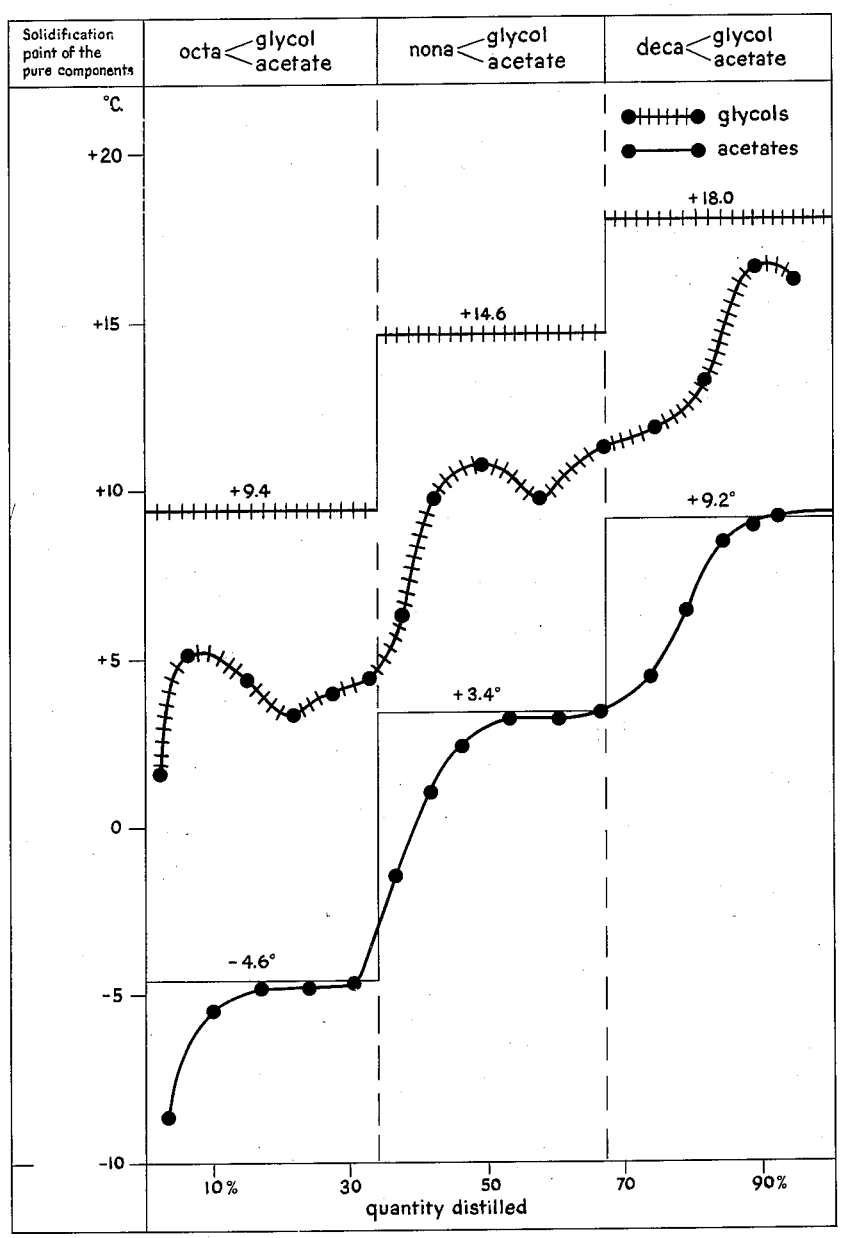

April 18, 1961

U. GEYER ET AL 2,980,737

PROCESS FOR OBTAINING PURE POLYALKYLENE GLYCOL ETHERS

Filed July 5, 1957

3 Sheets-Sheet 1

ULRICH GEYER
MAX SPILLMANN
ARNOLD STALDER
EUGEN TAGMANN

BY
ATTORNEY

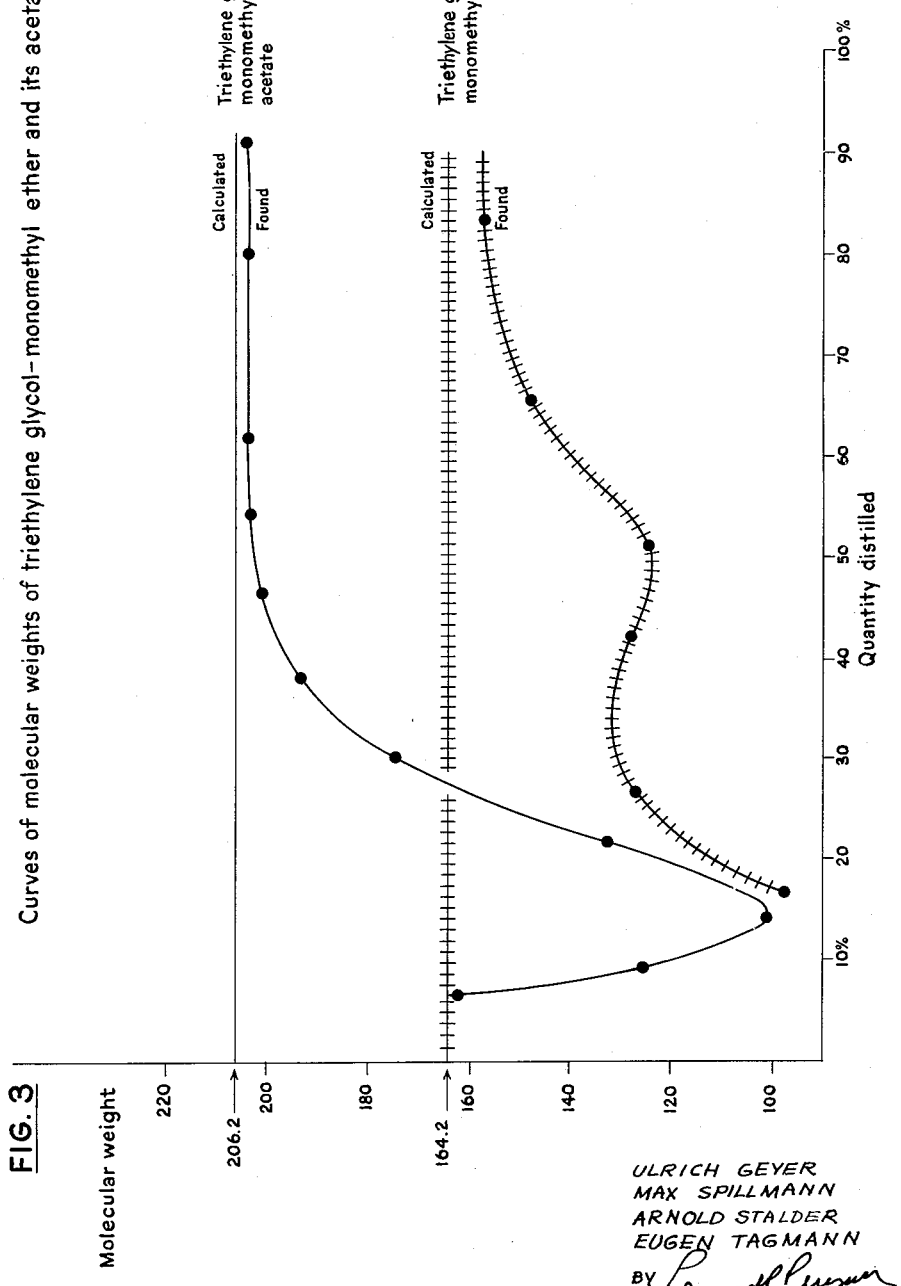

United States Patent Office 2,980,737
Patented Apr. 18, 1961

2,980,737
PROCESS FOR OBTAINING PURE POLY-ALKYLENE GLYCOL ETHERS

Ulrich Geyer, Binningen, Max Spillmann, Therwil, Arnold Stalder, Basel, and Eugen Tagmann, Therwil, Switzerland, assignors to Ciba Pharmaceutical Products Inc., Summit, N.J.

Filed July 5, 1957, Ser. No. 670,182
Claims priority, application Switzerland July 4, 1956
4 Claims. (Cl. 260—616)

This invention provides a process for obtaining individual pure polyalkylene glycols, more especially polyethylene glycols, monoethers and carboxylic acid esters thereof from mixtures of these compounds.

It is known that in the synthesis of polyalkylene glycols or their monoalkyl ethers by alkoxylation there are obtained mixtures of compounds having different degrees of polymerization and molecular weights. For example, a commercially available polyethylene glycol having a mean molecular weight of 400 is composed of the following individual polyethylene glycols:

| Polyethylene glycols | Molecular weight | Proportion, percent |
|---|---|---|
| Tetra-ethylene glycol | 194 | 1 |
| Penta-ethylene glycol | 238 | 3 |
| Hexa-ethylene glycol | 282 | 6 |
| Hepta-ethylene glycol | 326 | 9 |
| Octa-ethylene glycol | 370 | 13 |
| Nona-ethylene glycol | 415 | 14 |
| Deca-ethylene glycol | 459 | 14 |
| Undeca-ethylene glycol | 503 | 12 |
| Dodeca-ethyleneglycol | 547 | 10 |
| Trideca-ethylene glycol | 591 | 7 |
| Tetradeca-ethylene glycol | 635 | 5 |
| Pentadeca-ethylene glycol | 679 | 3 |
| Hexadeca-ethylene glycol | 723 | 1 |

Attempts to split up such mixtures into their individual components by fractional distillation are beset with considerable practical difficulties. Even when highly efficient fractionating columns and highly efficient reflux conditions are used, there are obtained fractions in which the individual components are only slightly enriched.

The present invention is based on the observation that mixtures of polyalkylene glycols and their monoethers, especially their monoalkyl ethers such as their mono-lower alkyl ethers for example their monomethyl or monoethyl ethers can easily be split up in good yield into their individual components by converting a mixture of polyalkylene glycols or monoethers thereof into carboxylic acid esters thereof which are capable of being distilled, and splitting up the resulting ester mixture into its components by fractional distillation, and, if desired, de-acylating the individual acyl-compounds. Thus, it has been found that mixtures of the aforesaid esters, in contra-distinction to mixtures of the polyalkylene glycols or their monoethers, can be split up very advantageously. This could not have been expected, because in the case of both types of mixtures the differences in the boiling points of the individual components are of the same order. Although the esterification usually results in raising the boiling points there is less risk of decomposition of the acyl-derivatives than of the polyalkylene glycols or their monoethers. As mixtures of esters to be subjected to the splitting operation there are advantageously used those of fatty acids of low molecular weight such as acetic acid or propionic acid.

The esterification and also the de-acylation, may be carried out by methods in themselves known. In working up the individual products, after hydrolysing the acylated product, for example, by means of an alkali metal or alkaline earth metal compound of alkaline reaction such as a hydroxide of such a metal, the water-soluble glycol can be recovered in a simple manner from the hydrolysis solution by salting out and extraction with a solvent. For the salting out operation there are advantageously used alkali metal or alkaline earth metal hydroxides, salts or acids, which form salts in the hydrolysis liquor. An especially simple method is one in which, for example, after hydrolysis with an excess of an alkali metal hydroxide the clear aqueous hydrolysis solution is so concentrated by evaporation that the free polyalkylene glycol or monoether thereof separates out, and is easily separated from the concentrated aqueous or dry inorganic residue by extraction with a solvent. As solvents there are especially suitable those which are immiscible with water and are incapable of dissolving the inorganic residue, such as benzene, toluene, chloroform etc.

The individual polyalkylene glycols, their monoalkyl ethers or carboxylic acid esters having a well defined degree of polymerization and a definite molecular weight are useful as starting materials for making pharmaceutical preparations or as diluents or solvents, for example, also for pharmaceutical substances for example for the preparation of polethylene glycolesters of p-butylamino-benzoic acid, and are also useful as textile assistants.

The following examples illustrate the invention:

EXAMPLE 1

300 grams of a mixture consisting of equal parts of synthetically prepared octa-, nona- and deca-ethylene glycol monomethyl ether are heated with 600 grams of acetic anhydride in the presence of 60 grams of pyridine for 5 hours at 100° C. The acetylation mixture is freed from excess of acetic anhydride and acetic acid under reduced pressure produced by a water jet pump, then distilled in a double tube column 35 centimeters high and 55 millimeters wide, which is provided with an inner tubular column 25 centimeters high and 35 millimeters wide, filled with McMahon saddle-shaped bodies 6 x 6 millimetres of non-rusting wire gauze having 950 meshes per square centimeter and held in position on both sides with York mesh steel gauze. The distillate formed by condensation of the vapour is drawn off from the space between the inner and outer tubes. The temperature equilibrium caused by the two concentrically arranged tubes results in practically adiabtic conditions in the inner column. The pressure and temperature are measured at the top of the column. At that position the apparatus is connected through a condenser to a high vacuum unit. At a rate of distillation of 100–200 grams per hour and a reflux ratio of about 1:10 the fractionation represented in Fig. 1 of the accompanying drawings was obtained.

The individual well defined fractions of the monomethyl ethers of octa-, nona- and deca-ethylene glycol acetate were hydrolysed by boiling in a 2 N-solution of caustic soda, the hydrolysis mixture was concentrated by evaporation to a content of alkaline liquor of 20–30% by weight, and the hydrolysis products were isolated with toluene. By purifying the fractions by distillation under a high vacuum in a Claisen flask the pure octa-, nona- and deca-ethylene glycol monomethyl ethers were obtained.

For the purpose of comparison a corresponding non-acetylated polyethylene glycol monomethyl ether mixture was fractionated under identical conditions of distillation. The result of the distillation of the non-esterified mixture is shown in Fig. 1 for comparison with the corresponding acetate mixture.

As a criterion of purity there was used, inter alia, the solidification point (SP) as being a very specific analytical characteristic. The physical data of the respective pure homologous ocmpounds are given in Table I.

Table 1

| Compound | Free glycol HO-[CH$_2$CH$_2$O]$_n$CH$_3$ | | | Glycol acetate CH$_3$COO[CH$_2$CH$_2$O]$_n$CH$_3$ | | |
|---|---|---|---|---|---|---|
| Number of ethoxy groups $n=$ | 8 | 9 | 10 | 8 | 9 | 10 |
| Properties: | | | | | | |
| Boiling point, °C | 188 | 210 | 230 | 200 | 215 | 235 |
| under mm. pressure of mercury | 0.08 | 0.10 | 0.20 | 0.14 | 0.10 | 0.20 |
| Solidification point (SP), °C | 9.4 | 14.6 | 18.0 | −4.6 | 3.4 | 9.2 |
| Refractive index, $n_D^{20}$ | 1.4580 | 1.4604 | 1.4610 | 1.4532 | 1.4556 | 1.4570 |
| Density, $d_4^{20}$ | 1.089 | 1.095 | 1.095 | 1.087 | 1.093 | 1.096 |
| Molecular weight: | | | | | | |
| calculated | | | | 426.5 | 470.5 | 514.6 |
| found [1] | | | | 425.1 | 467.6 | 511.1 |

[1] On the basis of the saponification number.

EXAMPLE 2

A polyethylene glycol monomethyl ether having a mean molecular weight of 350 was heated with 1.5 equivalents of acetic anhydride for 5 hours at 100° C., and the excess of acetic anhydride and acetic acid was distilled off under reduced pressure. The crude acetylation mixture was fractionally distilled. The fraction boiling at 212–215° C. under 0.10 mm. pressure of mercury was identified as pure non-ethylene glycol monomethyl ether acetate. After being hydrolysed at the boil for 5 hours with 3 equivalents of 2 N-solution of caustic soda, the reaction solution was concentrated to a final concentration of about a 7 N-solution of caustic soda, the hydrolysis product was extracted with toluene. The residue from the toluene extract solution was distilled in a high vacuum in an ordinary Claisen flask, and pure nona-ethylene glycol monomethyl ether was obtained in a yield of 9.2% calculated on the crude product used as starting material. This yield corresponds to the effective content of pure nona-ethylene glycol monomethyl ether in the initial mixture. The physical properties of the free nona-ethylene glycol monomethyl ether isolated in this manner are as follows:

Boiling point _____ 210° C. (0.12 mm. pressure of Hg)
S.P. _____ 14.2° C.
$n_D^{20}$ _____ 1.4600
$d_4^{20}$ _____ 1.092

From non-acylated polyethylene glycol monomethyl ether, which was distilled under analogous conditions for comparison, the fractions obtained consisted of mixtures. These fractions were evaluated with respect to their content of non-ethylene glycol monomethyl ether, as described in Example 1, by acetylation followed by fractional distillation of the acetylated products. The results of this distillation are shown in Table 2.

From this data it will be seen that by this fractional distillation the desired nona-ethylene glycol mono-methyl ether is enriched merely in fractions 3–6, but could not be isolated in pure form.

EXAMPLE 3

200 grams of an ordinary commercial triethylene glycol monomethyl ether were heated with 1.5 equivalents of acetic anhydride for 5 hours at 100° C. After distilling off acetic acid and the excess of acetic anhydride, the crude product so obtained was fractionated under 11 mm. pressure of mercury in a Podbielniak-Heligrid column 55 centimeters high and having a diameter of 12 millimeters at a reflux ratio of 1:50 and with a fall in vapour pressure (between the top of the column and the distillation still) of 12 centimeters glycol column. The quantity of distillate per hour amounted to 4 to 4.5 grams. The distillate yielded 27.5% of pure triethylene glycol monomethyl ether acetate having the following physical properties.

Boiling point _____ 140.5° C. (12 mm. pressure Hg)
$n_D^{20}$ _____ 1.4320
$d_4^{20}$ _____ 1.0546

After hydrolysing this product by boiling it for 5 hours with 3 equivalents of a 3 N-solution of caustic soda and concentrating the hydrolysis mixture to a concentration of alkaline liquor of about 30% by weight, the crude hydrolysis product was extracted with chloroform. By distillation in an ordinary Claisen flask there was obtained pure triethylene glycol monomethyl ether having the following properties:

Boiling point _____ 126–127° C. (11 mm. pressure Hg)
$n_D^{20}$ _____ 1.4380
$d_4^{20}$ _____ 1.0481

Molecular weight determination (carried out by determining the acetylation value). Found: 164.2. Calculated: 164.2.

The non-acylated product which was fractionated under the same conditions for the purpose of comparison gave a constant boiling distillate, which according to the refractive index and molecular weight determinations consisted of a non-unitary mixture of the starting components. The boiling point curves of a crude ordinary commercial triethylene gylcol monoethyl ether and of

Table 2

[Results of distillation of polyethylene glycol monomethyl ether having a mean molecular weight of 350]

| Fraction | Distillation | | SP-interval, degrees | $n_D^{20}$-interval | Percent by weight of distillate (additive) | Effective content of [1] |
| | mm. Pressure of mercury | boiling point, degrees | | | | |
|---|---|---|---|---|---|---|
| 1 | 0.35 | 46–200 | −10 | 1.4335–1.4509 | 20.0 | 0 |
| 2 | 0.35 | 200–207 | −10 to −5 | 1.4509–1.4569 | 41.6 | 0 |
| 3 | 0.35 | 207–211 | −5 to 0 | 1.4569–1.4572 | 59.2 | 10.6 |
| 4 | 0.35 | 211–247 | 0 to 6.2 | 1.4572–1.4580 | 68.5 | 19.1 |
| 5 | 0.55 | 247 | 6.2 to 8.5 | 1.4580–1.4585 | 71.8 | 25.0 |
| 6 | 0.55–2.0 | 247–271 | 8.5 to 11.6 | 1.4585–1.4605 | 89.5 | 18.5 |
| 7 | 2.0 | 271–273 | 11.6 to 12.6 | 1.4605–1.4606 | 95.4 | 0 |

Figure 2:
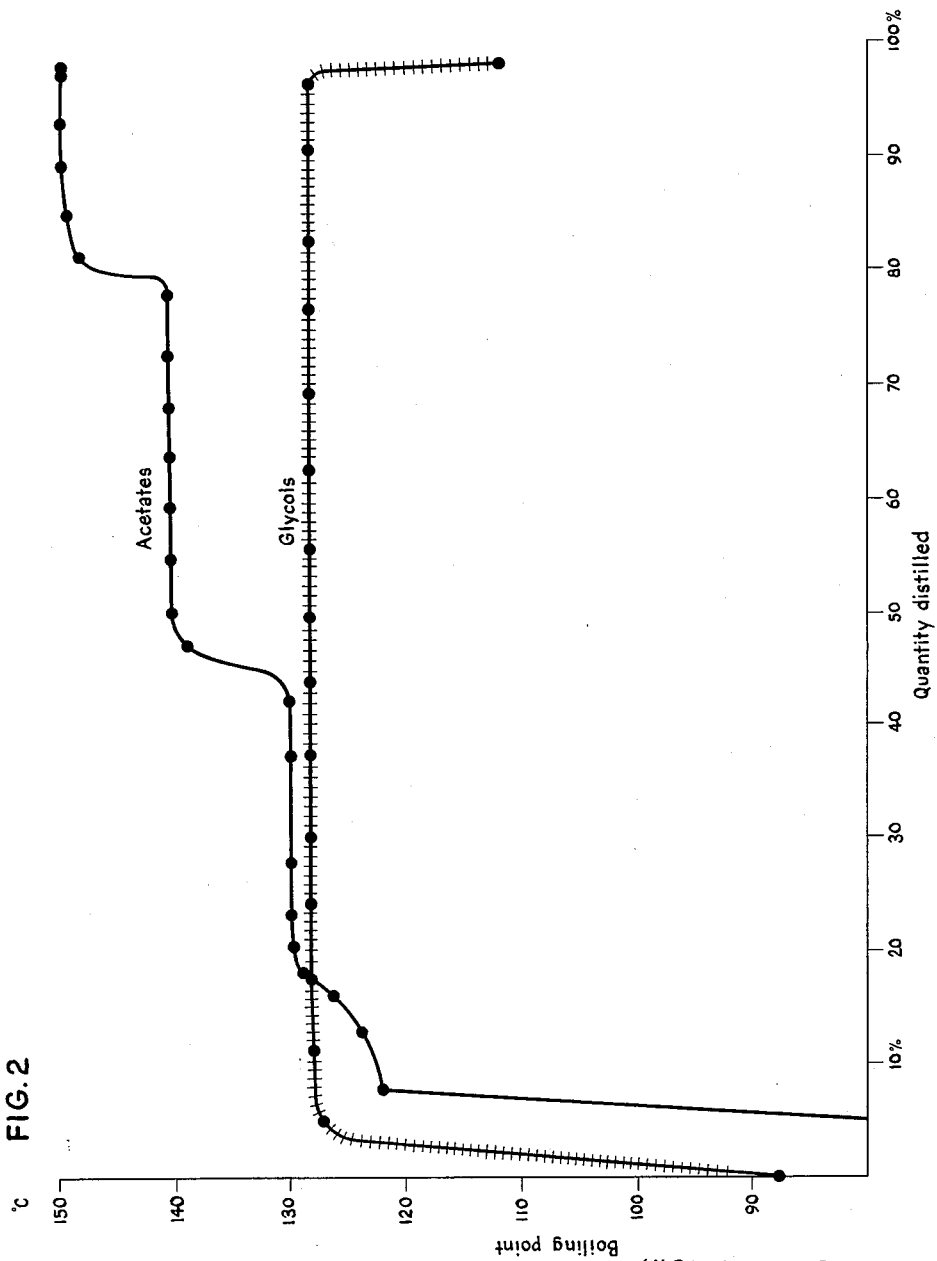

[1] Nona-ethylene glycol monomethyl ether in percentage by weight.

the corresponding acylated mixture when distilled under analogous conditions are shown in Fig. 2.

EXAMPLE 4

200 grams of a triethylene gylcol monomethyl ether of different origin from that used in Example 3 and acetylated in the manner described in that example, were distilled. The course of the distillation was compared with that of the non-acetylated triethylene glycol monomethyl ether. The fractional distillations were carried out in a Podbielniak-Heligrid column under the conditions described in Example 3. At a distillation rate of 4.5 to 7 grams per hour there were obtained, calculated on the molecular weights determined by refractive indices and hydrolysis or acetylation numbers, respectively, the following yields of pure products: 17.2% of triethylene glycol monomethyl ether and 56.9% of triethylene glycol monomethyl ether acetate, respectively.

The courses of these two distillations with respect to the molecular weights found are graphically represented in Fig. 3. The progression of boiling points and associated refractive indices and the molecular weights found are set out in Tables 3 and 4.

By hydrolysing the triethylene glycol monomethyl ether acetate in the manner described in Example 3 there was obtained pure triethylene glycol monomethyl ether in a yield of 49.2% calculated on the weight of the starting material.

Table 3

[Distillation of triethylene glycol monomethyl ether ($n_D^{20}$=1.4380; mol. wt.=164.2)]

| Fraction | Boiling point (11 mm. Hg) | Percent by weight of distillate (additive) | $n_D^{20}$ | Mol. wt.[1] found |
|---|---|---|---|---|
| 1 | 67–88 | 6.6 | 1.4268 | |
| 2 | 88–126 | 15.4 | 1.4380 | 97.9 |
| 3 | 126–126.5 | 26.0 | 1.4402 | 126.4 |
| 4 | 126.5 | 32.8 | 1.4402 | |
| 5 | 126.5 | 38.9 | 1.4404 | 127.8 |
| 6 | 126.5 | 43.5 | 1.4402 | |
| 7 | 126.5–127.0 | 47.1 | 1.4402 | 124.4 |
| 8 | 127.0–127.5 | 54.8 | 1.4398 | |
| 9 | 127.5 | 64.3 | 1.4394 | 147.9 |
| 10 | 127.5–128.0 | 73.9 | 1.4392 | |
| 11 | 128.0 | 82.5 | 1.4392 | 156.4 |
| 12 | 128.0 | 91.1 | 1.4392 | |
| 13 | residue | 93.5 | | |

[1] The molecular weights were calculated from the saponification or acetylation values found, on the assumption that only one acetylatable hydroxyl function was present in the molecule.

Table 4

[Distillation of triethylene glycol monomethyl ether acetate ($n_D^{20}$=1.4320; mol. wt.=206.2)]

| Fraction | Boiling point (11 mm. Hg) | Percent by weight of distillate (additive) | $n_D^{20}$ | Mol. wt.[1] found |
|---|---|---|---|---|
| 1 | 72–95 | 3.1 | 1.4200 | |
| 2 | 95–122 | 6.8 | 1.4216 | 162.1 |
| 3 | 122–128 | 9.5 | 1.4288 | 125.4 |
| 4 | 128–132 | 15.8 | 1.4306 | 101.0 |
| 5 | 132–135 | 22.2 | 1.4312 | 132.6 |
| 6 | 135–136 | 26.4 | 1.4316 | |
| 7 | 136–137 | 30.5 | 1.4316 | 174.4 |
| 8 | 137–137.5 | 34.5 | 1.4316 | |
| 9 | 137.5 | 38.5 | 1.4316 | 193.8 |
| 10 | 137.5 | 42.6 | 1.4318 | |
| 11 | 137.5–139.0 | 46.5 | 1.4318 | 201.3 |
| 12 | 139.0 | 50.7 | 1.4318 | |
| 13 | 139.0 | 54.8 | 1.4318 | 203.3 |
| 14 | 139.0 | 58.5 | 1.4318 | |
| 15 | 139.0 | 62.1 | 1.4316 | 203.8 |
| 16 | 139.0 | 65.2 | 1.4318 | |
| 17 | 139.0 | 80.2 | 1.4318 | 203.4 |
| 18 | 139.0 | 86.6 | 1.4318 | |
| 19 | 139.0 | 91.8 | 1.4322 | 203.1 |
| 20 | 139.0 | 94.7 | 1.4322 | |
| 21 | residue | 97.9 | | |

[1] The molecular weights were calculated from the saponification or acetylation values found, on the assumption that only one acetylatable hydroxyl function was present in the molecule.

EXAMPLE 5

500 grams of a commercially available polyethylene glycol monomethyl ether having a mean molecular weight of 425 was acetylated by the method described in Example 2. The crude acetylation product was fractionally distilled in the double tube column described in Example 1. After subsequent redistillation at an hourly rate of about 100 grams of distillate there were obtained 45.4 grams or 9.08% (calculated on the weight of the starting material) of pure nona-ethylene glycol monomethyl ether acetate in the form of a pale yellow oil boiling at 208–215° C. under 0.16 mm. pressure of mercury and having a solidification point of 3.2° C. Molecular weight determination gave a molecular weight of 475.5 (calculated=470.54).

By hydrolysis in the manner described in Example 2 pure nona-ethylene glycol monomethyl ether was obtained in a yield of 8.82% calculated on the starting material used.

What is claimed is:

1. A process for obtaining individual polyethylene glycol mono-lower alkyl ethers which comprises esterifying a mixture of polyethylene glycol mono-lower alkyl ethers with acetic acid, subjecting the resulting mixture of esters to fractional distillatiion to separate the individual esters and deacetylating the separated individual esters by hydrolysis.

2. A process for obtaining polyethylene glycol mono-lower alkyl ethers, which comprises esterifying a mixture of polyethylene glycol mono-lower alkyl ethers with a lower fatty acid, subjecting the resulting mixture of esters to fractional distillation to separate the individual esters and deacylating a resulting individual ester by hydrolysis.

3. A process as claimed in claim 2 wherein a mixture of polyethylene glycol monomethyl ethers is used as starting material.

4. A process as claimed in claim 2 wherein a mixture of polyethylene glycol monomethyl ethers containing nonaethylene glycol monomethylether is used as starting material.

References Cited in the file of this patent

UNITED STATES PATENTS 2,229,222    Reid    Jan. 21, 1941
2,714,608    Matter    Aug. 2, 1955

OTHER REFERENCES

Wurtz: Ann. Chim. et Phys. (3) 69, 334–335 (1863).
Markley: "Fatty Acids," 1947, chapter 22, pp. 575–595.
Curme et al.: "Glycols," 1952.
Kirk et al.: "Encyclopedia of Chemical Technology," Interscience Encylclopedia, Inc., New York, N.Y., 1954, vol. 12, p. 673, compound # 56.
Ishii et al.: Chem Abst. 49, 6904f–h (1955).

UNITED STATES PATENT OFFICE
CERTIFICATE OF CORRECTION

Patent No. 2,980,737                                        April 18, 1961

Ulrich Geyer et al.

It is hereby certified that error appears in the above numbered patent requiring correction and that the said Letters Patent should read as corrected below.

Column 1, in the table, column 1, line 9 thereof, for "Dodeca-ethyleneglycol" read -- Dodeca-ethylene glycol --; column 3, lines 25 and 50, for "non-ethylene" read -- nona-ethylene --; column 6, line 43, for "nonaethylene" read -- nona-ethylene --.

Signed and sealed this 28th day of November 1961.

(SEAL)
Attest:

ERNEST W. SWIDER                                    DAVID L. LADD
Attesting Officer                                          Commissioner of Patents